(12) United States Patent
Suda et al.

(10) Patent No.: US 8,774,877 B2
(45) Date of Patent: Jul. 8, 2014

(54) MOBILE ELECTRONIC DEVICE

(75) Inventors: Kazuyoshi Suda, Yokohama (JP); Akira Koyama, Yokohama (JP)

(73) Assignee: Kyocera Corporation, Kyoto (JP)

( * ) Notice: Subject to any disclaimer, the term of this patent is extended or adjusted under 35 U.S.C. 154(b) by 137 days.

(21) Appl. No.: 13/517,297

(22) PCT Filed: Dec. 24, 2010

(86) PCT No.: PCT/JP2010/073381
§ 371 (c)(1),
(2), (4) Date: Jun. 20, 2012

(87) PCT Pub. No.: WO2011/078341
PCT Pub. Date: Jun. 30, 2011

(65) Prior Publication Data
US 2012/0262858 A1    Oct. 18, 2012

(30) Foreign Application Priority Data

Dec. 24, 2009    (JP) .................. 2009-293386

(51) Int. Cl.
*H04M 1/00* (2006.01)
(52) U.S. Cl.
USPC ................................... 455/575.1
(58) Field of Classification Search
USPC ................................... 455/575.1
See application file for complete search history.

(56) References Cited

U.S. PATENT DOCUMENTS

| 6,506,513 B1 | 1/2003 | Yonetsu et al. |
| 2004/0224209 A1 | 11/2004 | Ninomiya et al. |
| 2005/0031916 A1 | 2/2005 | Ozeki |
| 2005/0282048 A1 | 12/2005 | Kamo et al. |
| 2006/0154132 A1 | 7/2006 | Misawa |

FOREIGN PATENT DOCUMENTS

| CN | 101405530 A | 4/2009 |
| JP | 2001093551 A | 4/2001 |
| JP | 200455307 A | 2/2004 |
| JP | 2004071259 A | 3/2004 |
| JP | 2004265835 A | 9/2004 |
| JP | 2005332685 A | 12/2005 |
| JP | 2006004659 A | 1/2006 |
| JP | 2006196313 A | 7/2006 |
| JP | 2007014068 A | 1/2007 |
| JP | 2007088804 A | 4/2007 |
| JP | 2007179845 A | 7/2007 |
| JP | 200943699 A | 2/2009 |
| JP | 2009176425 A | 8/2009 |
| JP | 2009270365 A | 11/2009 |

OTHER PUBLICATIONS

International Search Report and Written Opinion for PCT/JP2010/073381, dated Mar. 15, 2011.

(Continued)

*Primary Examiner* — Joel Ajayi
(74) *Attorney, Agent, or Firm* — Lowe Hauptman & Ham, LLP

(57) ABSTRACT

According to an aspect, a mobile electronic device includes: a first housing; a second housing; a hinge portion for coupling the first housing and the second housing; and a fuel cell that is mounted to at least either one of the first housing and the second housing, and that uses liquid fuel. The hinge portion has formed thereon a fuel injection port from which the liquid fuel used in the fuel cell can be externally injected.

9 Claims, 7 Drawing Sheets

(56) References Cited

OTHER PUBLICATIONS

Darkhorse_loga, "No electrical outlets are needed, A mobile phone having incorporated therein a fuel cell that can be charged as soon as possible has been emerged", [online], Oct. 6, 2009, Gigazine, [Dec. 3, 2009], Internet <URL: http://gigazine.net/index.php?/news/connments/20091006_fuel_cell_ceatec_japan_2009/>.

Extended European Search Report dated Sep. 25, 2013, corresponds to European patent application No. 10839570.8.

Office Action issued Feb. 27, 2014, corresponds to Chinese patent application No. 201080058683.6, for which an explanation of relevance is attached.

MOBILE ELECTRONIC DEVICE

CROSS-REFERENCE TO RELATED APPLICATION

This application is a National Stage of PCT international application Ser. No. PCT/JP2010/073381 filed on Dec. 24, 2010 which designates the United States, and which is based upon and claims the benefit of priority from Japanese Patent Application No. 2009-293386, filed on Dec. 24, 2009.

FIELD

The present disclosure relates to a mobile electronic device having a fuel cell mounted thereto.

BACKGROUND

There are mobile electronic devices having mounted thereto a fuel cell. An example of the mobile electronic device described above include a mobile phone described in Non Patent Literature 1. The mobile phone described in Non Patent Literature 1 is a so-called flip phone, which has a fuel cell, a fuel tank, and a fuel injection port mounted to a housing that is gripped and where operation buttons are provided.

CITATION LIST

Non Patent Literature

Non Patent Literature 1: darkhorse_loga, "No electrical outlets are needed, A mobile phone having incorporated therein a fuel cell that can be charged as soon as possible has been emerged", [online], 2009.10.6, Gigazine, [2009. 12.3], Internet <URL: http://gigazine.net/index.php?/news/comments/20091006_fuel_cell_ceatec_japan_2009/>

TECHNICAL PROBLEM

When a fuel injection port is formed on the housing that is to be gripped as described in the above-mentioned literature, the size of the housing might increase.

For the foregoing reasons, there is a need for a mobile electronic device that has mounted thereto a fuel cell, wherein a fuel injection port can be formed without an increase in a size of a housing.

SUMMARY

According to an aspect, a mobile electronic device includes: a first housing; a second housing; a hinge portion for coupling the first housing and the second housing; and a fuel cell that is mounted to at least either one of the first housing and the second housing, and that uses liquid fuel. The hinge portion has formed thereon a fuel injection port from which the liquid fuel used in the fuel cell can be externally injected.

According to another aspect, the first housing is configured to be capable of being opened and closed about a rotation axis of the hinge portion with respect to the second housing, and the fuel injection port is formed on an end face of the hinge portion in the direction of the rotation axis.

According to another aspect, the mobile electronic device further includes a fuel tank that can store the liquid fuel injected from the fuel injection port to be supplied to the fuel cell. The first housing has mounted thereto a display unit, and the second housing has mounted thereto an operation portion, and the fuel cell and the fuel tank are mounted to the first housing.

According to another aspect, the mobile electronic device further includes a control substrate that is mounted to the first housing and that can execute a control process. The first housing has provided thereto a partition that separates the fuel tank from the control substrate.

According to another aspect, when the first housing and the second housing can be configured to be foldable through the hinge portion, and the closed surfaces of the first housing and the second housing in a folded state are defined as front surfaces of the first housing and the second housing, while the surfaces opposite to the front surfaces are defined as back surfaces of the first housing and the second housing, the display unit includes a main display unit mounted at the front surface side of the first housing, and a sub-display unit mounted at the back surface side of the first housing, and the fuel tank and the sub-display unit are arranged side by side at the back surface side of the first housing along the extending direction of the back surface of the first housing.

According to another aspect, the mobile electronic device further includes a connection pipe that can be expanded and contracted for connecting the fuel tank and the fuel injection port.

According to another aspect, a heat exhaust port for exhausting heat generated from the fuel cell is formed on the back surface of the first housing.

According to another aspect, a thread groove that can be threadably engaged with a fuel supply port of a fuel supply device is formed on the fuel injection port.

According to another aspect, the fuel injection port is configured through an engagement between an outer injection port member arranged at the outside of the hinge portion in the axial direction and an inner injection port member arranged at the inside from the outer injection port member in the axial direction, and an injection port mounting portion held between the outer injection port member and the inner injection port member is provided to the first housing.

According to another aspect, the mobile electronic device further includes a sealing cap that is detachably attached to the fuel injection port.

According to another aspect, the hinge portion couples an end of the first housing and an end of the second housing, the first housing and the second housing are configured to be foldable through the hinge portion, and an outer diameter of the fuel injection port is larger than a thickness of the first housing and a thickness of the second housing, and smaller than a total thickness of the first housing and the second housing when the first housing are folded with respect to the second housing.

Advantageous Effects of Invention

According to the present invention, the mobile electronic device can be formed thin, and the degree of freedom of a layout of components of each housing can be increased, since the fuel injection port is formed on a hinge portion.

DESCRIPTION OF EMBODIMENTS

The present invention will be described below with reference to the drawings. The present invention is not limited by embodiments (exemplary embodiments) for embodying the present invention. The constituents in the embodiments described below include those easily assumed by a person skilled in the art, those substantially equal to these constituents, and so-called equivalents. A mobile phone will be described below as one example of the mobile electronic device, but a subject to which the present invention is applied is not limited to the mobile phone. The present invention is applicable to PHSs (Personal Handy phone Systems), PDAs (Personal Data Assistants), portable navigation devices, notebook personal computers, and mobile gaming devices.

Embodiment

Figure 1:
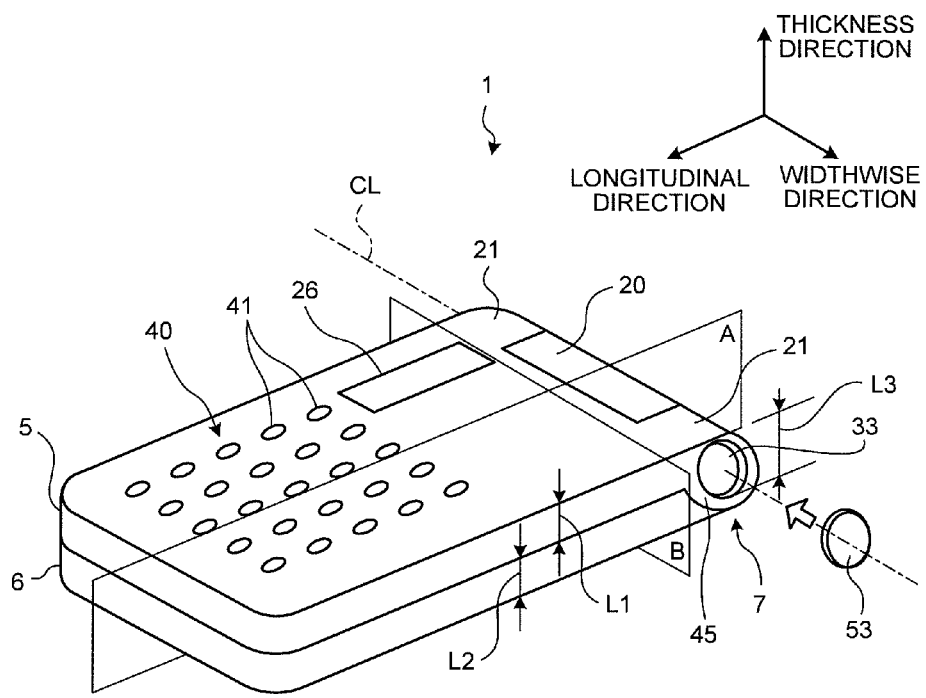
FIG. 1 is a perspective view illustrating an appearance of a mobile electronic device according to an embodiment.
Figure 2:
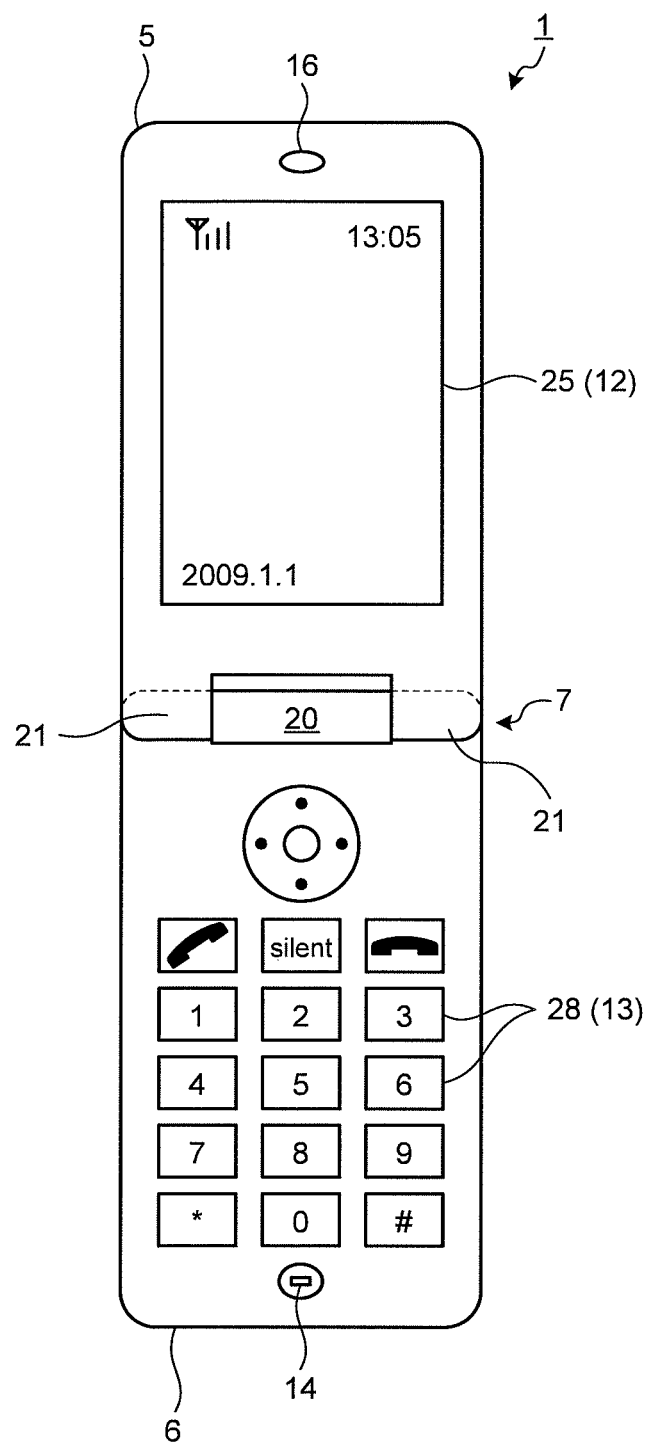
FIG. 2 is a front view illustrating the mobile electronic device according to the embodiment.

FIG. 1 is a perspective view illustrating an appearance of a mobile electronic device according to a present embodiment, and FIG. 2 is a front view of the mobile electronic device according to the present embodiment. As illustrated in FIGS. 1 and 2, the mobile electronic device 1 is a so-called flip phone, and has mounted thereto a fuel cell unit 10 that generates power at the expense of liquid fuel. The mobile electronic device 1 according to the present embodiment will specifically be described below.

The mobile electronic device 1 includes a first housing 5, a second housing 6, and a hinge portion 7 that links one end (base end) of the first housing 5 and one end (base end) of the second housing 6. The first housing 5 can be opened and closed with respect to the second housing 6 about a rotation axis CL of the hinge portion 7, whereby the mobile electronic device 1 is configured to be foldable. The closed surfaces (the surfaces that face each other) of the first housing 5 and the second housing 6 when they are closed about the hinge portion 7 are front surfaces of the first housing 5 and the second housing 6, while the surfaces opposite to the front surfaces are back surfaces of the first housing 5 and the second housing 6. The axial direction of the rotation axis CL of the hinge portion 7 is the same as the widthwise direction (lateral direction) of the first housing 5 and the second housing 6. The direction orthogonal to the widthwise direction and extended from the base end to a leading end of each of the housings 5 and 6 is a longitudinal direction, while the direction extended from the front surface to the back surface of each of the housings 5 and 6 is a thickness direction.

Figure 3:
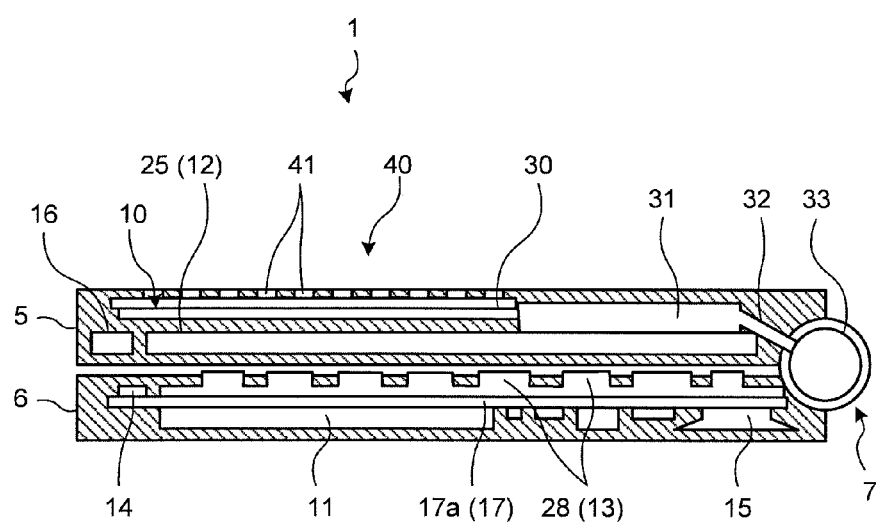
FIG. 3 is a sectional view illustrating the mobile electronic device illustrated in FIG. 1 taken along an A plane orthogonal to the widthwise direction.
Figure 4:
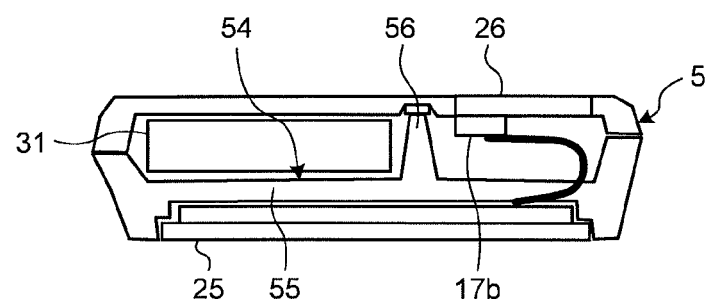
FIG. 4 is a sectional view illustrating a first housing of the mobile electronic device illustrated in FIG. 1 taken along a B plane orthogonal to a longitudinal direction.

FIG. 3 is a sectional view illustrating the mobile electronic device illustrated in FIG. 1 taken along an A plane orthogonal to the widthwise direction, and FIG. 4 is a sectional view illustrating the first housing of the mobile electronic device illustrated in FIG. 1 taken along a B plane orthogonal to the longitudinal direction. As illustrated in FIG. 3, the mobile electronic device 1 includes the fuel cell unit 10, a battery 11, a display unit 12, an operation unit 13, a microphone 14, a speaker 15, a receiver 16, and a control unit 17, which are mounted to the first housing 5 or to the second housing 6.

The first housing 5 mainly has mounted thereto the display unit 12, the fuel cell unit 10, and the receiver 16. The first housing 5 also has mounted thereto a sub-control substrate 17b of the control unit 17. The sub-control substrate 17b is an auxiliary control substrate that can control the display unit 12 (see FIG. 4). A sub-display 26 of the display unit 12 described later is mounted on the back surface of the first housing 5. Although the detail will be described later, the first housing 5 has a heat-exhaust port 40 from which heat generated from the fuel cell unit 10 is exhausted.

The second housing 6 mainly has mounted thereto the operation unit 13, the battery 11, the microphone 14, and the speaker 15. The second housing 6 has mounted thereto a main control substrate 17a of the control unit 17. The main control substrate 17a is a major control substrate that can control the respective components of the mobile electronic device 1.

The hinge portion 7 links a part of the first housing 5 and a part of the second housing 6. Specifically, the hinge portion 7 includes a bearing portion 20 that moves together with the second housing 6, and a pair of rotation axis portions 21 and 21 that move together with the first housing 5. The bearing portion 20 is formed at the center of the base end of the second housing 6 in the widthwise direction. A pair of rotation axis portions 21 and 21 are provided at both sides of the base end of the first housing 5 in the widthwise direction. The bearing portion 20 and the pair of rotation axis portions 21 and 21 are coupled to be rotatable in such a manner that the pair of rotation axis portions 21 and 21 sandwich the bearing portion 20 from both sides. With this structure, the hinge portion 7 can allow the first housing 5 and the second housing 6 to be moved between an open position and a close position about the rotation axis CL.

In a state where the first housing 5 and the second housing 6 of the mobile electronic device 1 are at the open position, the second housing 6 is gripped by a user. Therefore, the gripped portion of the second housing 6 is closed, while the first housing 5 is exposed. When the first housing 5 and the second housing 6 are at the close position, the mobile electronic device 1 is generally placed onto a desk or the like in a state in which the first housing 5 directs upward and the second housing 6 directs downward. Therefore, the front surface and the back surface of the second housing 6 are closed, while the back surface of the first housing 5 is exposed.

As illustrated in FIGS. 1 to 5, the display unit 12 is mounted on the first housing 5, and includes a main display 25 and a sub-display 26. The main display 25 is formed almost all over the front surface of the first housing 5. On the other hand, the sub-display 26 is formed on one end of the back surface of the first housing 5 in the widthwise direction, and on the base end of the first housing 5.

The operation unit 13 includes plural operation keys 28 that are arranged at the front surface side of the second housing 6. The microphone 14 is arranged at the other end (leading end) of the front surface side of the second housing 6. The speaker 15 is arranged at the base end of the back surface side of the second housing 6. The receiver 16 is arranged at the other end (leading end) of the front surface side of the first housing 5. The battery 11 is arranged at the leading end of the back surface side of the second housing 6.

As described above, the control unit 17 includes the main control substrate 17a and the sub-control substrate 17b. The main control substrate 17a is mounted to the second housing 6, and is arranged between the operation keys 28 arranged at the front surface side and the battery 11 arranged at the back surface side. The sub-control substrate 17b is mounted on the first housing 5, and is arranged between the main display 25 arranged at the front surface side and the sub-display 26 arranged at the back surface side.

Figure 5:
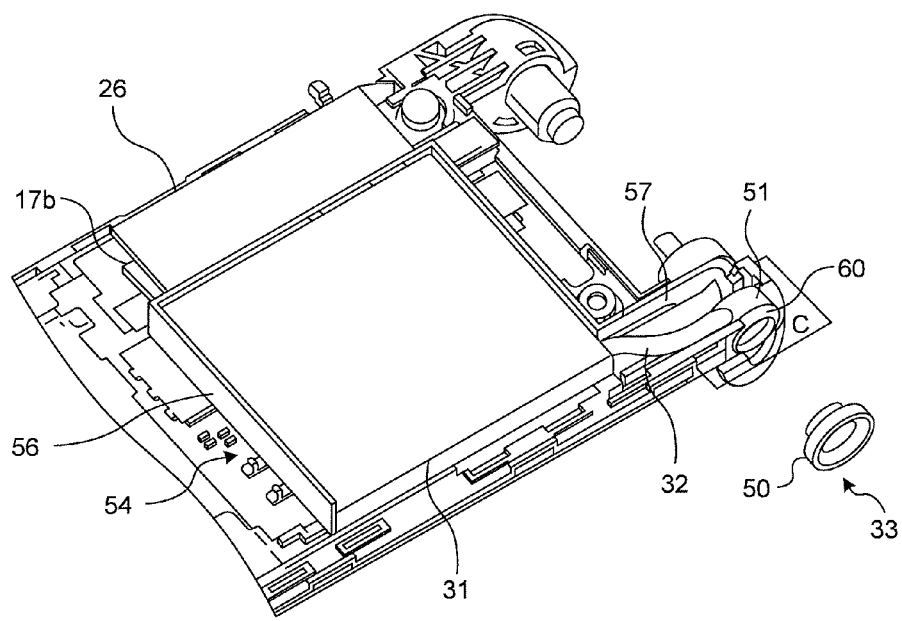
FIG. 5 is a partially exploded view illustrating a fuel tank and a sub-display mounted to a base end of the first housing, and their surroundings.

The fuel cell unit 10 is mounted to the first housing 5, and includes a fuel cell power-generating portion 30, a fuel tank 31, a connection pipe 32, and a fuel injection port 33. FIG. 5 is a partially exploded view illustrating the fuel tank and the sub-display mounted on the base end of the first housing, and their surroundings.

The fuel cell power-generating portion 30 generates power at an expense of liquid fuel. Methanol is used as the liquid fuel, for example. The fuel cell power-generating portion 30 is arranged at the back surface side of the first housing 5 at the leading end, and includes a cell stack having plural fuel cells connected to one another, each fuel cell including a fuel electrode, a solid polymer membrane, and an air electrode. The fuel cell power-generating portion 30 generates electricity through an electrochemical reaction between the liquid fuel and air externally taken in the cell stack.

As illustrated in FIG. 1, a heat exhaust port 40 is formed on the back surface of the first housing 5, which covers the fuel cell power-generating portion 30, at the leading end, wherein the heat exhaust port 40 supplies air to the cell stack, and exhaust heat generated from the fuel cell power-generating portion 30. The heat exhaust port 40 includes plural through-holes 41 that communicate the inside and outside of the first housing 5 with each other. The plural through-holes 41 are formed in a matrix, for example, and each through-hole 41 is circular, for example. Although the plural through-holes 41 are formed in a matrix, the configuration is not limited thereto. The plural through-holes 41 may be formed in staggered alignment. The shape of each through-hole 41 is not limited to be circular. The through-hole 41 may be an elongated hole or a slit.

With this structure, even when the user grips the mobile electronic device 1, or even when the mobile electronic device 1 is put on a desk or the like with the sub-display 26 directing upward, the heat exhaust port 40 is hardly closed. Therefore, the heat exhaust port 40 can efficiently take air into the fuel cell power-generating portion 30, as well as can efficiently exhaust heat generated from the fuel cell power-generating portion 30. Thus, the power generation efficiency of the fuel cell power-generating portion 30 can be enhanced.

As illustrated in FIG. 5, the fuel tank 31 is a rectangular tank that is formed by resin molding to be thin in the thickness direction. The fuel tank 31 can store liquid fuel therein. The fuel tank 31 is arranged at the base end of the back surface side of the first housing 5. This structure can make the connection pipe 32 shorter than in the case where the fuel tank 31 is arranged at the leading end of the first housing 5. The fuel tank 31 and the sub-display 26 are arranged side by side at the back surface side of the first housing 5 in the widthwise direction. The liquid fuel injected from the fuel injection port 33 through the connection pipe 32 is stored in the fuel tank 31. The liquid fuel stored in the fuel tank 31 is supplied toward the fuel cell power-generating portion 30, as needed.

The connection pipe 32 is to connect the fuel injection port 33 and the fuel tank 31, and is configured by using a bellows expansive pipe. One end of the connection pipe 32 is connected to the fuel injection port 33, while the other end is connected to the end of the surface of the fuel tank 31 at the base end in the widthwise direction (to the end near the fuel injection port 33). This structure can shorten the connection pipe 32, whereby the layout of the connection pipe 32 can be facilitated. Accordingly, even if the fuel tank 31 is deviated due to external impact, the connection pipe 32 can be expanded or contracted with the positional deviation of the fuel tank 31, resulting in that the impact resistance of the fuel cell unit 10 can be enhanced.

As illustrated in FIGS. 4 and 5, the first housing 5 includes a liquid-leakage partition 54 that prevents the liquid fuel from leaking toward the sub-control substrate 17b, the sub-display 26, and the main display 25, when the fuel tank 31 is broken. The liquid-leakage partition 54 includes a front partition 55 arranged at the front surface side of the fuel tank 31, a side partition 56 arranged around the fuel tank 31, and a pipe partition 57 arranged at the inside of the connection pipe 32 in the widthwise direction.

The front partition 55 is formed to be rectangle, and arranged between the fuel tank 31 and the main display 25. The side wall 56 is arranged on three sides, which are between the fuel tank 31 and the sub-control substrate 17b as well as the sub-display 26, at the leading end side of the fuel tank 31, and at the base end side of the fuel tank 31. The pipe partition 57 is arranged to be continuous with the side partition 56 arranged at the base end side of the fuel tank 31 along the extending direction (longitudinal direction) of the connection pipe 32 so as to be located at the inside of the connection pipe 32 in the widthwise direction.

By virtue of this configuration, the liquid-leakage partition 54 can separate the fuel flowing portion from the fuel injection port 33 toward the fuel tank 31 through the connection pipe 32 from the other portions. Accordingly, even if the fuel tank 31 is broken due to the external impact, or even if the liquid fuel leaks around the connection pipe 32 or the fuel injection port 33, the liquid-leakage partition 54 can separate the fuel flowing portion from the other portions. Consequently, the liquid-leakage partition 54 can reduce possibility of the leakage of the liquid fuel toward the sub-control substrate 17b, the sub-display 26, and the main display 25.

Figure 6:
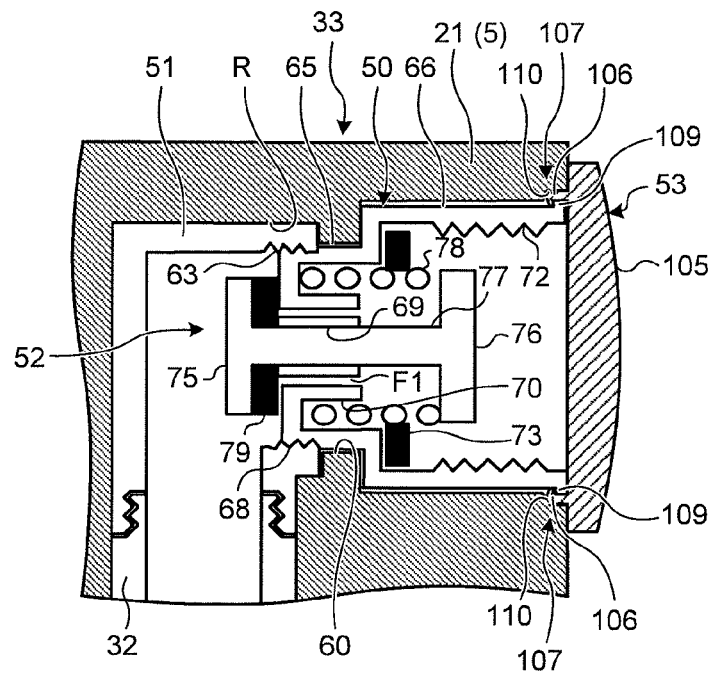
FIG. 6 is a partial sectional view illustrating a fuel injection port and its surrounding of the mobile electronic device illustrated in FIG. 5 taken along a C plane orthogonal to a thickness direction.

The fuel injection port 33 will next be described with reference to FIGS. 1, 5, and 6. FIG. 6 is a partial sectional view illustrating the fuel injection port and its surrounding of the mobile electronic device in FIG. 5 taken along a C plane orthogonal to the thickness direction. As illustrated in FIGS. 1, 5, and 6, the fuel injection port 33 is provided on an end face 45 of the rotation axis CL of the hinge portion 7, i.e., on the outer end face 45 in the axial direction of one of the rotation axis portions 21. The fuel injection port 33 includes an outer injection port member 50 mounted at the outside of the hinge portion 7 in the axial direction, an inner injection port member 51 mounted at the inside from the outer injection port member 50 in the axial direction, and an injection-side check valve 52 for preventing flowback of the liquid fuel. A sealing cap 53 is provided at the fuel injection port 33.

One of the rotation axis portions 21 of the hinge portion 7 includes a columnar accommodating space R into which the inner injection port member 51 and the outer injection port member 50 are accommodated. The accommodating space R has formed on its inner surface an injection port mounting portion 60 for mounting the fuel injection port 33. The injection port mounting portion 60 is annularly formed so as to project from the inner peripheral surface of the accommodating space R toward the inside in the diameter direction. The inner injection port member 51 is accommodated in the accommodating space R at the inside in the axial direction, while the outer injection port member 50 is accommodated in the accommodating space R at the outside in the axial direction, across the injection port mounting portion 60.

The inner injection port member 51 is formed to be cylindrical with a bottom. The connection pipe 32 is connected to the outer peripheral surface of the inner injection port member 51. The inside of the inner injection port member 51 and the connection pipe 32 communicate with each other. A thread groove 63 that can be threadably engaged with the outer injection port member 50 is formed on the inner peripheral surface of the inner injection port member 51. The inner diameter of the inner injection port member 51 is formed to be almost equal to the inner diameter of the injection port mounting portion 60, while the outer diameter of the inner injection port member 51 is formed to be larger than the inner diameter of the injection port mounting portion 60. Therefore, the outward movement of the inner injection port member 51 in the axial direction is restricted by the injection port mounting portion 60.

The outer injection port member 50 is formed to have a cylindrical shape whose diameter varies in the axial direction. The outer injection port member 50 includes a small-diameter portion 65 located at the inside in the axial direction and having a small diameter, and a large-diameter portion 66 located at the outside in the axial direction and having a large diameter, the small-diameter portion 65 and the large-diameter portion 66 being integrally formed. A screw thread 68 that can be threadably engaged with the inner injection port member 51 is formed on the outer peripheral surface of the small-diameter portion 65. An injection-side insertion hole 69 through which an axis 77 of the later-described injection-side check valve 52 is inserted is formed through the center axis of the small-diameter portion 65. A fuel injection channel F1 through which the liquid fuel flows is formed at the outside of the injection-side insertion hole 69 in the diameter direction. An injection-side spring accommodating portion 70 is formed at the outside of the fuel injection channel F1 in the diameter direction. The injection-side spring accommodating portion 70 goes to the inside in the axial direction so as to communicate with the inside of the large-diameter portion 66. A compression spring 78 of the later-described injection-side check valve 52 is accommodated into the injection-side spring accommodating portion 70. A thread groove 72 that can be threadably engaged with a fuel supply port 81 of a later-described fuel cartridge 80 is formed on the inner peripheral surface of the large-diameter portion 66. An O-ring 73 with which the fuel supply port 81 of the fuel cartridge 80 is in contact is provided at the bottom of the large-diameter portion 66 at the inside in the axial direction. The outer diameter of the small-diameter portion 65 is formed to be slightly smaller than the inner diameter of the injection port mounting portion 60, whereby the small-diameter portion 65 can pass through the injection port mounting portion 60 at its inner periphery. The outer diameter of the large-diameter portion 66 is formed to be larger than the inner diameter of the injection port mounting portion 60. Therefore, the inward movement of the outer injection port member 50 in the axial direction is restricted by the injection port mounting portion 60.

As described above, the fuel injection port 33 is configured in such a manner that the small-diameter portion 65 of the outer injection port member 50 is inserted into the injection port mounting portion 60 with the inner injection port member 51 being accommodated in the accommodating space R. Moreover, the outer peripheral surface of the small-diameter portion 65 of the outer injection port member 50 is screwed to the inner peripheral surface of the inner injection port member 51. Therefore, the injection port mounting portion 60 is held between the inner injection port member 51 and the outer injection port member 50 through the screwed engagement between the inner injection port member 50 and the outer injection port member 51. Thus, the fuel injection port 33 is fastened to the first housing 5, whereby resistance to external load can be enhanced.

The injection-side check valve 52 is provided at the outer injection port member 50, and includes a disk-like valve portion 75 for covering the end face of the small-diameter portion 65, a disk-like spring bearing 76 arranged at the inside of the large-diameter portion 66, and an axis portion 77 that links the center of the valve portion 75 and the center of the spring bearing portion 76. The injection-side check valve 52 includes a compression spring 78 that is provided between the small-diameter portion 65 and the spring bearing portion 76, and that is accommodated in the injection-side spring accommodating portion 70 of the small-diameter portion 65 to urge the spring bearing portion 76, and an O-ring 79 attached on the axis portion 77 side of the valve portion 75.

The valve portion 75 is configured such that its outer diameter has a size capable of sealing the fuel injection channel F1. By virtue of this structure, the compression spring 78 of the injection-side check valve 52 urges the spring bearing portion 76 toward the outside in the axial direction, whereby the valve portion 75 is pressed against the end face of the small-diameter portion 65. Thus, the injection-side check valve 52 usually seals the fuel injection channel F1 of the small-diameter portion 65. On the other hand, when the spring bearing portion 76 moves toward the inside in the axial direction against the urging force of the compression spring 78, the valve portion 75 and the end face of the small-diameter portion 65 are separated. Accordingly, the injection-side check valve 52 releases the sealing of the fuel injection channel F1 so that the liquid fuel can be flown.

As illustrated in FIG. 6, the sealing cap 53 covers the fuel injection port 33. The sealing cap 53 includes a cap body 105 formed to have a disk-like shape, and a pair of locking claws 106 and 106 formed at the inside of the cap body 105 in the axial direction. A pair of locking portions 107 and 107 with which the pair of locking claws 106 and 106 of the sealing cap 53 can be engaged is formed on the first housing 5 around the fuel injection port 33. The pair of locking portions 107 and 107 includes a pair of projecting portions 109 and 109 projecting toward the outside in the diameter direction at the outer peripheral edge at the outside of the outer injection port member 50 in the axial direction, and a pair of recess portions 110 and 110 that can receive the locking claws 106 and 106, which are formed at the outside in the diameter direction at the inner peripheral edge at the outside of the accommodating space R, accommodating the outer injection port member 50, in the axial direction.

With this structure, the sealing cap 53 can seal the fuel injection port 33 through the engagement between the pair of locking portions 107 and 107 formed on the first housing 5 and the pair of locking claws 106 and 106. Accordingly, the deposition of dusts on the fuel injection port 33 can be reduced, and the outer appearance of the mobile electronic device 1 is not deteriorated.

Figure 7:
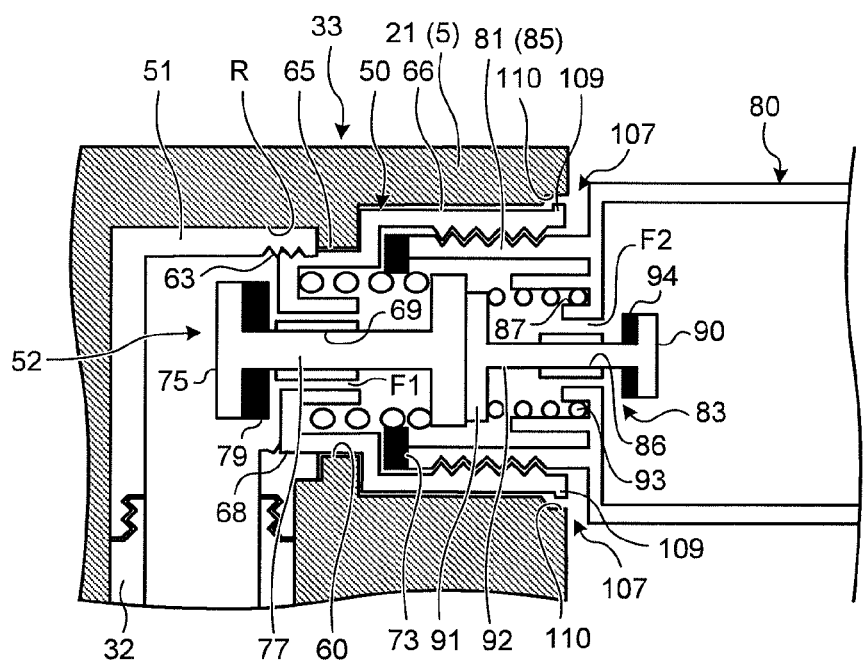
FIG. 7 is a partial sectional view illustrating a fuel injection port and its surrounding of the mobile electronic device illustrated in FIG. 5 taken along the C plane orthogonal to a thickness direction, when a fuel cartridge is attached thereto.

Then, a fuel injection operation for injecting the liquid fuel into the thus configured mobile electronic device 1 via the fuel injection port 33 will be described with reference to FIG. 7. FIG. 7 is a partial sectional view illustrating the fuel injection port and its surrounding of the mobile electronic device illustrated in FIG. 5, taken along the C plane orthogonal to the thickness direction, when the fuel cartridge is attached thereto. As illustrated in FIG. 7, the fuel cartridge 80, which serves as a fuel supply device for supplying the liquid fuel consumed in the fuel cell power-generating portion 30, is detachably attached to the fuel injection port 33. Before the description of the fuel injection operation, the fuel cartridge 80 will be described.

The fuel cartridge 80 has the fuel supply port 81 at which a supply-side check valve 83 is provided. The fuel supply port 81 is formed to be cylindrical, and has formed on the outer peripheral surface a screw thread 85 that can be threadably engaged with the large-diameter portion 66 of the outer injection port member 50. A supply-side insertion hole 86 through which an axis 92 of the later-described supply-side check valve 83 is inserted is formed through the center axis of the fuel supply port 81. A fuel injection channel F2 through which the liquid fuel flows is formed at the outside of the supply-side insertion hole 86 of the fuel supply port 81 in the diameter direction. A supply-side spring accommodating portion 87, which accommodates a compression spring 93 of the later-described supply-side check valve 83, is formed at the outside of the fuel injection channel F2 of the fuel supply port 81 in the diameter direction.

The supply-side check valve 83 is provided at the fuel supply port 81, and includes a disk-like valve portion 90 for covering the inner end face of the fuel cartridge 80 near the supply port, a disk-like spring bearing 91 arranged at the inside of the fuel supply port 81, and an axis portion 92 that links the center of the valve portion 90 and the center of the spring bearing portion 91, the valve portion 90, the spring bearing 91, and the axis portion 92 being integrally formed. The supply-side check valve 83 includes a compression spring 93 that is provided between the supply-side spring accommodating portion 87 and the spring bearing portion 91, and an O-ring 94 attached on the axis portion 92 side of the valve portion 90.

The valve portion 90 is configured such that its outer diameter has a size capable of sealing the fuel injection channel F2. By virtue of this structure, the compression spring 93 of the supply-side check valve 83 urges the spring bearing portion 91 toward the outside in the axial direction, whereby the valve portion 90 is pressed against the end face near the supply port. Thus, the supply-side check valve 83 usually seals the fuel injection channel F2 of the fuel supply port 81. On the other hand, when the spring bearing portion 91 moves toward the inside in the axial direction against the urging force of the compression spring 93, the valve portion 90 and the end face near the supply port are separated. Accordingly, the supply-side check valve 83 releases the sealing of the fuel injection channel F2 so that the liquid fuel can be flown.

When the liquid fuel is injected into the mobile electronic device 1, the screw thread 85 of the fuel supply port 81 of the fuel cartridge 80 is screwed to the thread groove 72 of the fuel injection port 33 of the mobile electronic device 1. With this, the spring bearing portion 76 of the injection-side check valve 52 provided at the fuel injection port 33 moves toward the inside of the axial direction with respect to the mobile electronic device 1. Further, the spring bearing portion 91 of the supply-side check valve 83 provided to the fuel supply port 81 moves toward the inside in the axial direction with respect to the fuel cartridge 80. Accordingly, the fuel injection channel F1 of the fuel injection port 33 is opened, and the fuel supply channel F2 of the fuel supply port 81 is opened. Thus, the liquid fuel in the fuel cartridge 80 can be supplied to the fuel tank 31 through the fuel supply port 81 and the fuel injection port 33.

Since the fuel injection port 33 is formed on the hinge portion 7, the mobile electronic device 1 thus configured does not need to form the fuel injection port 33 on the side face of the first housing 5 and the second housing 6. Therefore, as illustrated in FIG. 1, the thickness L1 of the first housing 5 and the thickness L2 of the second housing 6 of the mobile electronic device 1 can be reduced more than the diameter L3 of the fuel injection port 33.

Since the fuel injection port 33 is formed on the end face 45 of the rotation axis CL of the hinge portion 7 in the mobile electronic device 1, the direction of the force applied upon injecting the fuel into the fuel cartridge 80 can be made equal to the axial direction of the rotation axis CL of the hinge portion 7. With this configuration, even if a great load is applied to the fuel injection port 33, the mobile electronic device 1 can secure sufficient strength to the load applied upon injecting the fuel, compared to the case where the injection port is formed on the side face of the housing.

Since the fuel cell unit 10 is mounted on the first housing 5, the mobile electronic device 1 does not have to increase the thickness L2 of the second housing 6.

Since the liquid-leakage partition 54 is provided to the first housing 5, the mobile electronic device 1 can not only separate the fuel tank 31 from the sub-control substrate 17b, but also separate the fuel flowing portion, which is from the fuel injection port 33 to the fuel tank 31 through the connection pipe 32, from the other portions.

Figure 8:
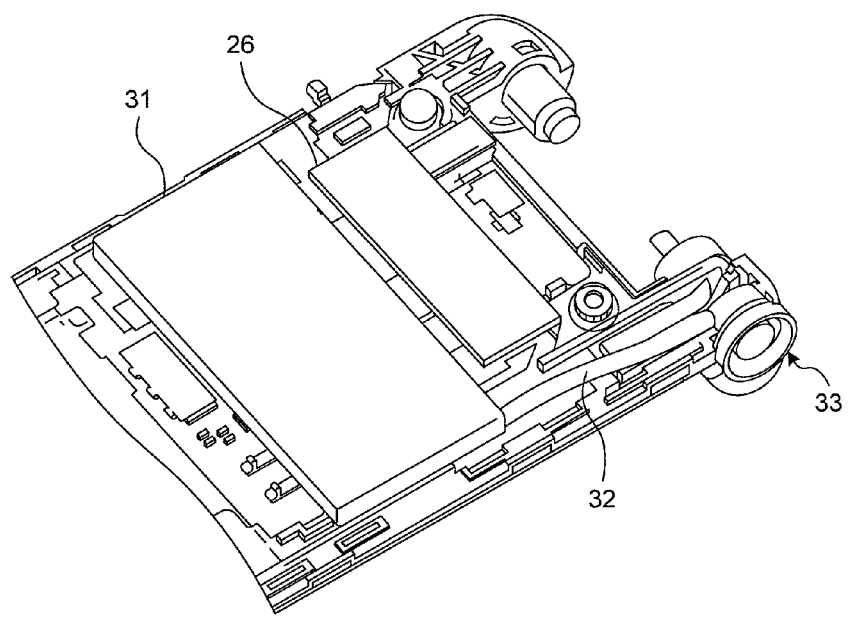
FIG. 8 is a partially exploded view illustrating the fuel tank and the sub-display, which are arranged side by side in the longitudinal direction, and their surroundings.

Since the fuel tank 31 and the sub-display 26 are arranged side by side in the widthwise direction at the back surface side of the first housing 5, the mobile electronic device 1 can realize an efficient layout in which the first housing 5 can be made thin. In the present embodiment, the fuel tank 31 and the sub-display 26 are arranged side by side in the widthwise direction. However, the arrangement is not limited thereto. For example, the fuel tank 31 and the sub-display 26 may be arranged side by side in the longitudinal direction as illustrated in FIG. 8.

Since the connection pipe 32 is expandable, it can be expanded and contracted with the positional deviation of the fuel tank 31, whereby the resistance to the external impact can be enhanced.

Since the heat exhaust port 40 is formed on the back surface of the first housing 5 of the mobile electronic device 1, the heat exhaust port 40 is hardly closed by a user.

Since the fuel supply port 81 of the fuel cartridge 80 is screwed to the fuel injection port 33 of the mobile electronic device 1, the fuel cartridge 80 is difficult to be detached.

Since the fuel injection port 33 can be formed between the outer injection port member 50 and the inner injection port member 51 across the injection port mounting portion 60 of the first housing 5, the resistance to the external load can be enhanced.

Since the sealing cap 53 that is detachable can be attached to the fuel injection port 33, the deposition of dusts on the fuel injection port 33 can be prevented. The outer appearance of the mobile electronic device 1 can also be made good.

The diameter L3 of the fuel injection port 33 is larger than the thickness L1 of the first housing 5 and the thickness L2 of the second housing 6, and smaller than the total thickness (L1+L2) of the first housing 5 and the second housing 6. Therefore, even if the fuel injection port 33 is formed on the hinge portion 7, the increase in the thickness of the mobile electronic device 1 can be prevented.

In this case, the fuel tank 31 and the battery 11 may be arranged not to be superimposed on each other in the thickness direction, when the first housing 5 and the second housing 6 of the mobile electronic device 1 are on the closed position. By virtue of this, the weight balance of the mobile electronic device 1 that is closed can be stabilized.

In the present embodiment, the sub-display 26 is mounted on the back surface of the first housing 5. However, the sup-display 26 may not be provided. In the present embodiment, the fuel cartridge 80 is attached by the screw engagement between the thread groove 72 formed on the fuel injection port 33 of the mobile electronic device 1 and the screw thread 85 formed on the fuel supply port 81 of the fuel cartridge 80. However, the thread groove 72 and the screw thread 85 may not be formed, and the liquid fuel may be injected by pressing the fuel supply port 81 of the fuel cartridge 80 against the fuel injection port 33 of the mobile electronic device 1.

The clamshell type mobile electronic device 1 has been described above, but a mobile electronic device of another type may be employed. For example, the present invention can be applied to a revolver type in which two housings are superimposed in the thickness direction, and a hinge portion is provided so as to relatively rotate the two housings about a rotation axis along the thickness direction.

INDUSTRIAL APPLICABILITY

As described above, the present invention is well adaptable to a mobile electronic device having mounted thereto a fuel cell, and more particularly, well adaptable to reduce a thickness of a mobile electronic device.

The invention claimed is:

1. A mobile electronic device comprising:
   a first housing;
   a second housing;
   a hinge portion for coupling the first housing and the second housing;
   a fuel cell mounted to the first housing, and that uses liquid fuel;
   a fuel injection port from which the liquid fuel used in the fuel cell is externally injected, is formed thereon the hinge portion;
   a fuel tank mounted to the first housing is configured to store the liquid fuel injected from the fuel injection port to supply to the fuel cell;
   a display unit mounted thereto the first housing; and
   an operation portion mounted thereto the second housing, wherein
   the first housing and the second housing includes front surfaces that face each other in a folded state and back surfaces opposite to the front surfaces,
   the display unit includes a main display unit mounted at the front surface side of the first housing, and a sub-display unit mounted at the back surface side of the first housing, and
   the fuel tank and the sub-display unit are arranged side by side at the back surface side of the first housing along the extending direction of the back surface of the first housing.

2. The mobile electronic device according to claim 1, wherein
   the first housing is configured to be capable of being opened and closed about a rotation axis of the hinge portion with respect to the second housing, and
   the fuel injection port is formed on an end face of the hinge portion in the direction of the rotation axis.

3. The mobile electronic device according to claim 1, further comprising:
   a control substrate mounted to the first housing that is configured to execute a control process, wherein
   the first housing provides thereto a partition that separates the fuel tank from the control substrate.

4. The mobile electronic device according to claim 1, further comprising:
   a connection pipe that is expandable and contractable for connecting the fuel tank and the fuel injection port.

5. The mobile electronic device according to claim 1, further comprising:
   a heat exhaust port for exhausting heat generated from the fuel cell is formed on the back surface of the first housing.

6. The mobile electronic device according to claim 1, further comprising:
   a thread groove that is threadably engaged with a fuel supply port of a fuel supply device is formed on the fuel injection port.

7. The mobile electronic device according to claim 1, wherein
   the fuel injection port is configured through an engagement between an outer injection port member arranged at the outside of the hinge portion in the axial direction and an inner injection port member arranged at the inside from the outer injection port member in the axial direction, and
   an injection port mounting portion held between the outer injection port member and the inner injection port member is provided to the first housing.

8. The mobile electronic device according to claim 1, further comprising:
   a sealing cap that is detachably attached to the fuel injection port.

9. The mobile electronic device according to claim 2, wherein
   the hinge portion couples an end of the first housing and an end of the second housing,
   the first housing and the second housing are configured to be foldable through the hinge portion, and
   an outer diameter of the fuel injection port is larger than a thickness of the first housing and a thickness of the second housing, and smaller than a total thickness of the first housing and the second housing when the first housing are folded with respect to the second housing.

* * * * *